3,352,901
(2-ALKYLIDENEACYL)PHENYLACETIC ACIDS, ESTERS, AND AMIDES

Everett M. Schultz, Ambler, and James M. Sprague, Gwynedd Valley, Pa., assignors to Merck & Co., Inc., Rahway, N.J., a corporation of New Jersey
No Drawing. Filed Mar. 7, 1963, Ser. No. 263,434
15 Claims. (Cl. 260—476)

This invention is concerned with (2-alkylideneacyl) phenylacetic acid compounds as well as the salts, esters and amides thereof, and with novel methods for the preparation of the novel compounds.

More specifically, the invention is concerned with compounds having the structural formula

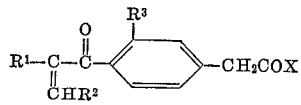

wherein:
$R^1$ is lower-alkyl, mononuclear aryl-lower alkyl or mononuclear-aryloxy;
$R^2$ is hydrogen or lower alkyl;
$R^3$ is hydrogen, halogen (especially chlorine, bromine, fluorine) and lower alkyl (advantageously methyl); and
X is selected from the group consisting of
  hydroxyl or salts of the resulting acids, i.e., metal salts, especially sodium, potassium, calcium and the like or amine salts,
  alkoxyl, unsubstituted or substituted, the substituent(s) being di-aliphatic amino and the like,
  amino, such as an amino group of the structure $-NR^4R^5$ wherein $R^4$ and $R^5$ are the same or different radical selected from
    hydrogen, aliphatic, unsubstituted or substituted, especially lower alkyl,
    aromatic, unsubstituted or substituted, especially substituted phenyl, or
    either $R^4$ or $R^5$ can be lower alkoxy, and additionally
  $R^4$ and $R^5$ can be joined together to form, with the nitrogen atom to which they are attached, a hetero ring containing one or more hetero atoms as morpholinyl, piperazinyl, pyrrolidinyl and the like, and 1,1-di-lower-alkyl-hydrazino.

The compounds of this invention and particularly compounds having the structure illustrated above where $R^1$ is lower alkyl, especially ethyl, $R^2$ is hydrogen, $R^3$ is hydrogen, chlorine, bromine, or methyl and X is hydroxyl, as well as derivatives thereof or precursors thereof which upon administration will generate the compounds of this invention, possess diuretic, natriuretic and chloruretic properties and are therefore useful in the treatment of ailments resulting from an excessive retention of fluid or an excesive retention of electrolytes especially sodium chloride or sodium and chloride ions, as in the treatment of edema and other conditions associated with electrolyte and fluid retention. These novel products can be administered either orally or intraperitoneally in the form of pills, capsules, tablets, elixir or injectable solutions all of which can be prepared by methods well known to pharmacists to contain from about 50 mg. to about 250 mg. per unit dosage form. As the amount to be administered to any one patient varies according to age, weight and many other factors, these dosage forms are made available so that the dose can be adjusted conveniently by the physician for the optimal effect in the individual patient.

The 2-alkylideneacylphenylacetic acid compounds of this invention generally are prepared by one of the procedures illustrated in the following reaction scheme:

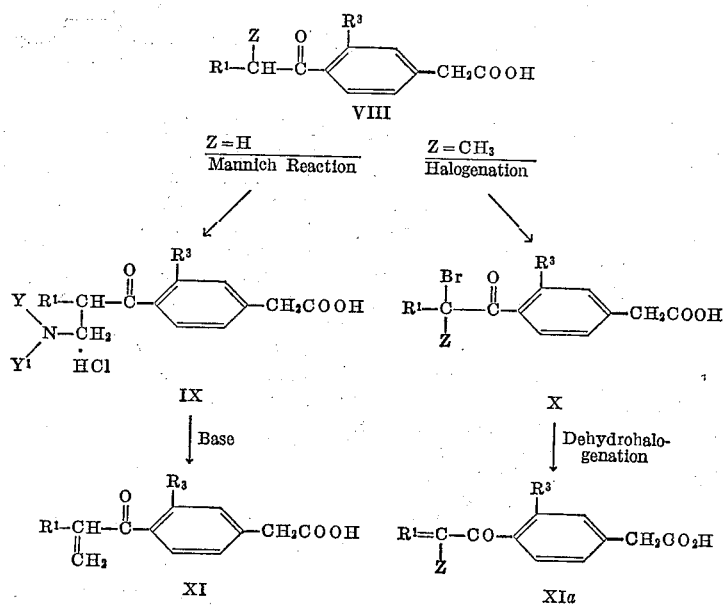

One of the methods illustrated above, i.e. the Mannich Reaction, involves converting the saturated-acyl compound (VIII) to a salt of a Mannich base by reaction of VIII with a salt of a secondary amine, $HNYY^1$, such as a di-lower-alkylamine, or cyclic amine as piperidine, morpholine and the like in the presence of formaldehyde or paraformaldehyde.

Treatment of the Mannich salt (IX) with a base such as sodium bicarbonate either with or without heat gives the desired 2-methyleneacylphenylacetic acid (XI).

The salts of the Mannich bases prepared by the above procedure are new products and form another feature of this invention.

When, in Compound VIII $Z=CH_3$ or $-CH_2$lower alkyl, an alternative method is employed wherein the unsaturated acyl group can be formed by brominating (or halogenating) the saturated-acyl group in Compound VIII thus forming Compound X and then removing hydrogen bromide (or hydrogen halide), thus introducing a double bond, by treatment with a dehydrohalogenating agent such as silver acetate or silver fluoride in benzene or lithium chloride or bromide in dimethylformamide and the like, to form Compound XIa.

The (saturated-acyl)phenylacetic acids (VIII) employed as starting materials in the foregoing procedures generally can be prepared by the method illustrated below.

preferably employing an excess of the Grignard reagent, yields 4-(1-hydroxyalkyl) - 1 - (3,3-diphenyl-3-hydroxypropyl)benzene (V).

Mild oxidation of V, using chromium trioxide, for example, regenerates the carbonyl group of the acyl moiety giving the 4-(saturated-acyl)-1-(3,3-diphenyl-3-hydroxypropyl)benzene (VI).

Dehydration of VI with acetic anhydride in acetic acid, with heating, gives a 4-(saturated-acyl)-1-(3,3-diphenyl-allyl)benzene (VII).

Further oxidation of VII with chromium trioxide gives the desired (saturated-acyl)phenylacetic acid (VIII).

While this procedure has general application in the preparation of the (saturated-acyl)phenylacetic acid intermediates (VIII), it is also possible, in some instances, to synthesize them directly by reacting the phenylacetic acid with a saturated-acyl halide by the Friedel-Crafts reaction, and each of these preferred methods will be described with more particularity in the following examples.

(Saturated-acyl)phenylacetic acid compounds (VIII) also can be prepared by hydrogenation of the (2-alkylideneacyl)phenylacetic acids (XI or XIa). This is a useful method for preparing (saturated-acyl)phenylacetic acid compounds having in the acyl group, a branched chain α-carbon, i.e. Compound VIII where $Z=CH_3$. These compounds then can be treated with a halogenating agent

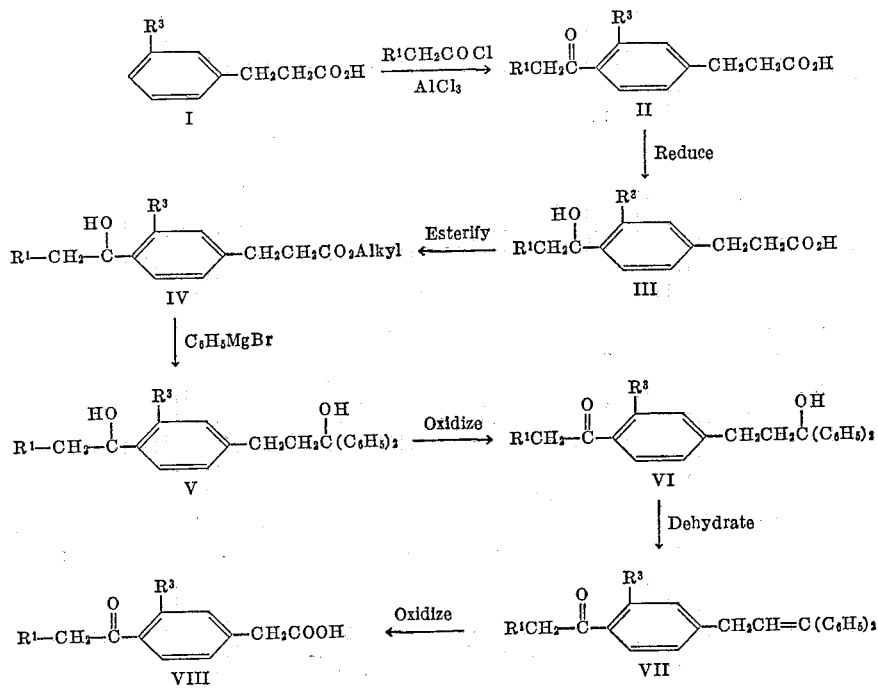

While some of the (saturated-acyl)phenylacetic acids (VIII) can be made by the Friedel-Crafts reaction using phenylacetic acid and a saturated-acyl halide, direct synthesis is not always possible. It was found, however, that substantially all the (saturated-acyl)phenylacetic acid compounds (VIII) needed as intermediates for the preparation of the novel products of this invention could be synthesized from phenylpropionic acids (hydrocinnamic acids), I, by the process illustrated above.

The Friedel-Crafts reaction is used to prepare the (saturated-acyl)phenylpropionic acid (II) by reacting a phenylpropionic acid (I) with the acyl halide, $R^1CH_2COhalide$, in the presence of aluminum chloride.

The carbonyl group of the acyl moiety in II then is reduced, advantageously with sodium borohydride, to the carbinol, forming Compound III and the carboxyl group then is esterified with any lower alkanol, as methanol, ethanol and the like, to give Compound IV.

Reaction of IV with the Grignard reagent, $C_6H_5MgBr$, advantageously with heating and in an inert atmosphere, to form Compound X which, upon treatment with a dehydrohalogenating agent forms the (2 - alkylideneacyl) phenylacetic acid (XIa). These procedures are described in more detail above in the discussion of the preparation of the novel compounds of this invention.

Dehydrohalogenation of compounds of the type illustrated by X in which R and Z are dissimilar can occur in more than one way and mixtures of isomers can be produced. However, when R or $Z=CH_3$, the one isomer will usually predominate. When mixtures of isomers do form, they often can be separated by fractional crystallization. Of course, when $R=Z$ only one position isomer is possible, although the possibility of cis-trans isomerism exists.

The following examples describe the various methods found particularly useful for the preparation of the novel compounds of this invention. It will be understood that the methods and compounds described therein are illustrative and that the invention is not to be limited to the specific reaction conditions or to the specific compounds prepared.

EXAMPLE 1

4-(2-methylenebutyryl)phenylacetic acid

*Step A: Preparation of 4-butyrylphenylacetic acid.*—To a stirred mixture of phenylacetonitrile (11.7 g., 0.1 mole) and aluminum chloride (53.6 g., 0.4 mole) is added butyryl chloride (21.4 g., 0.2 mole) during 2 hours. The mixture is heated and stirred 3 hours on the steam bath, and then poured into ice-water. The oily product is distilled yielding 12 g. of product, B.P. 148–163° C. at 0.7 mm. pressure. This oil partially crystallizes when chilled and the crystalline 4-butyrylphenylacetonitrile is obtained by pressing the mixture onto porous tile. Recrystallization from aqueous ethanol yields 2.5 g. of 4-butyrylphenylacetonitrile, M.P. 65–68° C.

4-butyrylphenylacetonitrile (8.8 g., 0.047 mole) and concentrated hydrochloric acid (150 ml.) are heated and stirred 0.75 hour on the steam bath. When the mixture is cooled, the product crystallizes. Recrystallization from aqueous ethanol yields 5 g. of 4-butyrylphenylacetic acid, M.P. 78–82° C. Additional recrystallizations give the product with a constant M.P. of 80–82° C.

Analysis calculated for $C_{12}H_{14}O_3$: C, 69.88; H, 6.84. Found: C, 70.00; H, 6.87.

*Step B: Preparation of 4-(2-dimethylaminomethylbutyryl)phenylacetic acid hydrochloride.*—A mixture of 4-butyrylphenylacetic acid (20.6 g., 0.1 mole), paraformaldehyde (4.2 g., 0.14 mole), dimethylamine hydrochloride (9.0 g., 0.11 mole) and ethanolic hydrogen chloride (1.5 ml.) is heated 1 hour on the steam bath. The resulting solid cake is triturated with 250 ml. of boiling isopropyl alcohol and the crystalline product collected, yielding 21.0 g. of 4-(2-dimethylaminomethylbutyryl)phenylacetic acid hydrochloride, M.P. 180–185° C.

*Step C: Preparation of 4-(2-methylenebutyryl)phenylacetic acid.*—A solution of 4-(2-dimethylaminomethylbutyryl)phenylacetic acid hydrochloride (18 g., 0.06 mole) in saturated sodium bicarbonate solution (150 ml.) is heated 12 minutes on the steam bath. The solution is cooled and acidified to precipitate the product which is recrystallized repeatedly from cyclohexane-benzene to obtain 2.3 g. of 4-(2-methylenebutyryl)phenylacetic acid, M.P. 73–75° C.

Analysis calculated for $C_{13}H_{14}O_3$: C, 71.54; H, 6.47. Found: C, 71.52; H, 6.35.

EXAMPLE 2

3-methyl-4-(2-methylenebutyryl)phenylacetic acid

*Step A: Preparation of 3-methyl-4-butyrylphenylacetic acid.*—To a 500 ml. round-bottom flask equipped with a stirrer, reflux condenser capped with a calcium chloride tube and a Gooch sleeve is added 3-methylphenylacetic acid (30.0 g., 0.2 mole), butyryl chloride (23.4 g., 0.22 mole) and carbon disulfide (100 ml.). To the resulting solution is added, portionwise, aluminum chloride (80.4 g., 0.6 mole) through the Gooch sleeve. After the addition is complete, the reaction mixture is heated in a water bath at 50° C. for 3 hours, cooled and the carbon disulfide removed by decantation. Ice water and concentrated hydrochloric acid (20 ml.) then are added and the product that separates is taken up in ether, the ether solution then is washed with water and subsequently extracted with 5% sodium bicarbonate (total volume 700 ml.). Upon acidification of the bicarbonate solution with concentrated hydrochloric acid, a green oil separates which is taken up in ether and dried over sodium sulfate, filtered and the ether then removed by evaporation. The residue is distilled and the fraction boiling between 145–170° C. at 0.5 mm. pressure collected and taken up in benzene. Petroleum ether is added until a white solid precipitates, M.P. 110–112° C. Recrystallization of this product from benzene (20 ml) and petroleum ether (40 ml.) gives 3-methyl-4-butyrylphenylacetic acid, M.P. 112–113° C.

Analysis calculated for $C_{13}H_{16}O_3$: C, 70.81; H, 7.32. Found: C, 70.86; H, 7.27.

*Step B: Preparation of 3-methyl-4-(2-methylenebutyryl)phenylacetic acid.*—By replacing the 4-butyrylphenylacetic acid employed in Example 1, Step B, by an equimolecular quantity of 3-methyl-4-butyrylphenylacetic acid and following substantially the same procedure described in Step B of Example 1 there is obtained 3-methyl-4-(2-dimethylaminomethylbutyryl)phenylacetic acid hydrochloride which, when treated with sodium bicarbonate by substantially the same procedure described in Step C of Example 1, forms 3-methyl-4-(2-methylenebutyryl)phenylacetic acid.

EXAMPLE 3

4-(2-ethylidenepropionyl)phenylacetic acid 4-(2-methylenebutyryl)phenylacetic acid (0.03 mole) prepared as described in Example 1, is dissolved in isopropyl alcohol (250 ml.) and 5% palladium on charcoal (3 g.) is added. The mixture is hydrogenated at an initial pressure of 35 pounds per square inch on a Parr apparatus. When the required amount of hydrogen is absorbed, the solution is warmed and filtered to remove the catalyst and the alcohol then is removed by evaporation to yield 4-(2-methylbutyryl)phenylacetic acid. This product is dissolved in acetic acid (200 ml.) and an equimolar amount of bromine in acetic acid (50 ml.) is added dropwise with stirring over a period of about 15 minutes after the reaction is initiated by adding 2 drops of 48% hydrobromic acid. The reaction mixture then is poured into 1 liter of water containing a small amount of sodium bisulfite and the product that precipitates is separated by filtration giving 4-(2-bromo-2-methylbutyryl)phenylacetic acid. This product is mixed with an excess of lithium bromide and dimethylformamide, heated at 80–90° C. for 4 to 5 hours and poured into water. The product that separates is removed by filtration giving 4-(2-ethylidenepropionyl)phenylacetic acid.

EXAMPLE 4

3-chloro-4-(2-methylenebutyryl)phenylacetic acid

*Step A: Preparation of 3-(3-chloro-4-butyrylphenyl)propionic acid.*—Aluminum chloride (61.0 g., 0.456 mole) and 3-chlorohydrocinnamic acid (25.8 g., 0.140 mole) is added to carbon disulfide (200 ml.) and the mixture stirred at 50° C. for 10 minutes. The mixture then is cooled to 25° C. and butyryl chloride (18.6 g., 0.175 mole) added dropwise over a one-half hour period. After the addition of the acid chloride, the mixture is heated in a water bath at 50° C. for 5 hours, then cooled in an ice bath and the carbon disulfide decanted. While cooling in an ice bath, ice water (100 ml.) and concentrated hydrochloric acid (15 ml.) is added to the dark gummy residue. The oil that separates is extracted with ether and the ether solution then extracted with five 100 ml. portions of 5% sodium bicarbonate. The bicarbonate extract is acidified with hydrochloric acid to yield 12 g. of 3-(3-chloro-4-butyrylphenyl)propionic acid which, after crystallization from methyl cyclohexane, melts at 79–80° C.

Analysis calculated for $C_{13}H_{15}ClO_2$: C, 61.30; H, 5.93. Found: C, 61.13; H, 5.93.

*Step B: Preparation of 3-[3-chloro-4-(1-hydroxybutyl)phenyl]propionic acid.*—The compound prepared in Step A (28.0 g., 0.110 mole) is dissolved in a solution of sodium hydroxide (7 g.) in water (100 ml.) and a solution of sodium borohydride (1.69 g.) in water (25 ml.) is added over 0.75 hour. The brown complex then is hydrolyzed by adding solid sodium hydroxide (15 g.), stirring for 0.75 hour and then boiling for 1 hour. The cooled mixture is extracted with ether, the ether extract washed well with water and dried over sodium sulfate. After removing the ether by evaporation, 29.0 g. of 3-[3-chloro-4-(1-hydroxybutyl)phenyl]propionic acid is obtained which is used in the next step without purification.

*Step C: Preparation of methyl 3-[3-chloro-4-(1-hydroxybutyl)phenyl]propionate.*—The compound prepared in Step B (27.0 g.) is dissolved in methanol (250 ml.), the temperature adjusted to 0° C., and concentrated sulfuric acid (7 ml.) carefully added. The mixture is kept at 0° C. for 16 hours (a higher temperature causes etherification of the hydroxyl group) and then water (1 liter) is added. The aqueous mixture is extracted with ether (three 60 ml. portions) and the ether extract washed with 10% sodium bicarbonate (50 ml.), and dried over sodium sulfate. Upon removing the ether by evaporation, the residue is distilled to give 23.3 g. of methyl 3-[3-chloro-4-(1-hydroxybutyl)phenyl]propionate, B.P. 152–153° C. at 0.3 mm. pressure. The product appears to be homogeneous by vapor phase chromatograph inspection.

Analysis calculated for $C_{14}H_{19}ClO_3$: C, 62.10; H, 7.07; Cl, 13.10. Found: C, 62.51; H, 6.93; Cl, 12.87

*Step D: Preparation of 3-[3-chloro-4-(1-hydroxybutyl)phenyl]-1,1-diphenylpropanol-1.*—To a Grignard reagent prepared from magnesium (12.4 g., 0.5 mole) and bromobenzene (80 g., 0.5 mole) in ether (160 ml.) is added, over ½ hour a solution of the compound prepared in Step C (11.1 g., 0.041 mole) in tetrahydrofuran (T.H.F., 40 ml.). A gentle stream of nitrogen is led through the flask and the mixture refluxed for 5 hours, ether being replaced by T.H.F. as it evaporates by entrainment with nitrogen (a total of 240 ml. of T.H.F. is used). The dark brown mixture obtained is cooled and added to a mixture of ice (400 g. and concentrated hydrochloric acid (100 ml.). The layers are separated and the water layer extracted with three 75 ml. portions of ether. The combined T.H.F. and ether extract then is washed with dilute hydrochloric acid, water, 5% sodium hydroxide and again with water. The solvent is evaporated and the residue submitted to steam distillation to remove the biphenyl formed in the reaction (3.5 liters of distillate is collected). The residue remaining is cooled, extracted with ether and the crude product isolated by evaporating the ether. The crude product (15 g.) is dissolved in a little benzene and placed on a column of neutral alumina (140 g.). The column is eluted with benzene (2 liters), and the effluent containing by-products discarded. The product is removed from the column by eluting with ether (600 ml.) to obtain 5.1 g. of product. Further elution by ethanol (500 ml.) yielded an additional 4.6 g. of 3-[3-chloro-4-(1-hydroxybutyl)phenyl]-1,1-diphenylpropanol-1.

Analysis calculated for $C_{25}H_{23}ClO_2$: C, 76.03; N, 6.89; Cl, 8.98. Found: C, 76.29; N, 6.85; Cl, 8.96.

*Step E: Preparation of 3-(3-chloro-4-butyrylphenyl)-1,1-diphenylpropanol-1.*—The compound prepared in Step D (4.84 g., 0.0122 mole) is dissolved in acetone (35 ml.) and the solution cooled to −15° C. A solution of chromium trioxide (2.44 g., 0.0244 mole) in a mixture of water (5 ml.) and concentrated sulfuric acid (2 ml.) was added with stirring over 1 hour. The mixture then is kept at −10° C. for 4 hours and then poured onto ice. The aqueous mixture is extracted with ether, the ether extract washed with water until clear, dried over sodium sulfate and evaporated to give 4.8 g. of 3-(3-chloro-4-butyrylphenyl)-1,1-diphenylpropanol-1 which is used in the next step without purification.

*Step F: Preparation of 2′-chloro-4′-(3,3-diphenylallyl)butyrophenone.*—A solution of the compound prepared in Step E (9 g.) in acetic acid (90 ml.) and acetic anhydride (50 ml.) is refluxed for 1 hour, and the solvents then removed by evaporation at reduced pressure. The residue is dissolved in ether, the ether solution washed with sodium bicarbonate solution and then water and dried over sodium sulfate. Upon removing the ether by evaporation there is obtained 8.24 g. of 2′-chloro-4′-(3,3-diphenylallyl)butyrophenone as a heavy syrup.

Analysis calculated for $C_{25}H_{24}ClO$: C, 79.88; H, 6.43. Found: C, 78.78; H, 6.42.

*Step G: Preparation of 3-chloro-4-butyrylphenylacetic acid.*—The compound prepared in Step F (1 g., 0.00264 mole) is dissolved in chloroform (10 ml.) and the solution warmed to 40° C. A solution of chromium trioxide (1.0 g., 0.01 mole) in water (2 ml.) and acetic acid (5.4 ml.) then is added dropwise with stirring. The temperature rises to 46° C. and a black solid separates. When the temperature begins to fall, the mixture is heated at 50° C. for 20 minutes. The solvents are removed at 35° C. under reduced pressure and dilute hydrochloric acid and ether are added to the residue. The ether solution is washed with dilute hydrochloric acid until clear and then with 10% sodium bicarbonate solution (25 ml.). When the bicarbonate extract is acidified, an oil that soon solidifies separates yielding 3-chloro-4-butyrylphenylacetic acid which after crystallization from methyl cyclohexane melts at about 67° C.

Analysis calculated for $C_{12}H_{13}ClO_3$: C, 59.88; H, 5.44; Cl, 14.73. Found: C, 59.56; H, 5.37; Cl, 14.83.

*Step H: Preparation of 3-chloro-4-(2-methylenebutyryl)-phenylacetic acid.*—3-chloro-4-butyrylphenylacetic acid (1 g., 0.0041 mole) is mixed with dimethylamine hydrochloride (0.335 g., 0.0041 mole) and paraformaldehyde (0.15 g., 0.0041 mole). Acetic acid (0.1 ml.) is added and the mixture heated on a steam bath for 1 hour. Water (100 ml.) is added and the mixture then extracted with ether. The aqueous layer is separated and made basic with sodium bicarbonate, heated on a steam bath at 90° C. for 10 minutes then cooled and acidified whereupon the mixture became cloudy. The aqueous mixture is extracted with ether, the ether then evaporated leaving 3-chloro-4-(2-methylenebutyryl)phenylacetic acid.

Analysis calculated for $C_{13}H_{13}ClO_3$: C, 61.78; H, 5.20; Cl, 14.03. Found: C, 61.56; H, 5.30; Cl, 13.80.

EXAMPLE 5

*3-bromo-4-(2-methylenebutyryl)phenylacetic acid*

By replacing the 3-chlorohydrocinnamic acid employed in Example 4, Step A, by an equimolar quantity of 3-bromohydrocinnamic acid, and then following substantially the same procedures and using the same reagents and reactants employed in Steps A through H of Example 4, there is obtained 3-bromo-4-(2-methylenebutyryl)phenylacetic acid.

EXAMPLE 6

*4-(2-phenoxyacryloyl)phenylacetic acid*

*Step A: Preparation of 4-bromoacetylphenylacetic acid.*—4-acetylphenylacetic acid (17.8 g., 0.1 mole), prepared by substantially the same method described in Example 2, Step A, but replacing the 3-methylphenylacetic acid and the butyryl chloride by equimolar quantities of phenylacetic acid and acetyl chloride, respectively, is dissolved in acetic acid (100 ml.), and bromine (16 g., 0.1 mole) in acetic acid (20 ml.) is added dropwise at 25–30° C. If the first few drops of bromine added is not decolorized at once, 2 drops of 48% hydrobromic acid are added to bring about immediate decolorization of the bromine. After all the bromine has been added, the mixture is kept for 0.5 hour at 25–30° C. and then poured into water (1 liter) containing 2–3 g. of sodium bisulfite. The solid that separates is collected, washed with water and dried over phosphorus pentoxide to give 4-bromoacetylphenylacetic acid.

*Step B: Preparation of 4-phenoxyacetylphenylacetic acid.*—Sodium (4.6 g.) is dissolved in absolute ethanol (200 ml.) and phenol (9.4 g., 0.1 mole) is added. The mixture is stirred and heated on a steam bath, then the 4-bromoacetylphenylacetic acid, prepared in Step A, is dissolved in alcohol and added dropwise. After the addition is completed the mixture is refluxed for 2 hours. The alcohol is removed by distillation and water is added to the residue. Upon acidification of the residue, an oil separates and is taken up in ether, the ether solution washed with dilute hydrochloric acid and water and dried over sodium sulfate. The ether then is evaporated to.

obtain 4-phenoxyacetylphenylacetic acid which is crystallized from benzene.

*Step C: Preparation of 4-(2-phenoxyacryloyl)phenylacetic acid.*—4-phenoxyacetylphenylacetic acid (10 g., 0.03 mole), paraformaldehyde (1.2 g., 0.04 mole), dimethylamine hydrochloride (3.24 g., 0.04 mole) and acetic acid (5 drops) are heated at 80–90° C. for 2 hours. Water and ether then are added, the mixture shaken and the ether layer removed. The aqueous layer is made basic with sodium bicarbonate and the mixture heated at 80–90° C. for 20 minutes. Upon acidification, 4-(2-phenoxyacryloyl)phenylacetic acid separates and is crystallized from benzene.

EXAMPLE 7

*4-(2-methylene-3-phenylpropionyl)phenylacetic acid*

*Step A: Preparation of 4-(3-phenylacryloyl)phenylacetic acid.*—4-acetylphenylacetic acid (3.4 g., 0.0193 mole) prepared as described in Example 6, Step A, and benzaldehyde (2.1 g., 0.0193 mole) is dissolved in a mixture of sodium hydroxide (1.8 g., 0.045 mole) in water (160 ml.) and ethanal (10 ml.). The solution is kept at 25–30° C. for 16 hours, acidified and the solid that separates is collected, dried at 65° C. and crystallized from benzene, to give 4-(3-phenylacryloyl)phenylacetic acid.

*Step B: Preparation of 4-(3-phenylpropionyl)phenylacetic acid.*—4 - (3 - phenylacryloyl)phenylacetic acid (19.5 g., 0.0764 mole) is dissolved in warm isopropyl alcohol (25 ml.), the solution is cooled and 5% palladium on carbon (4 g.) is added under nitrogen. The mixture is shaken under hydrogen at 755 mg. mercury pressure until 1900 ml. of hydrogen has been absorbed. The catalyst is removed and the solvent evaporated at reduced pressure at 90–100° C. The yellow residual oil solidifies on standing and is crystallized from benzene to give 4-(3-phenylpropionyl)phenylacetic acid.

*Step C: Preparation of 4-(2-methylene-3-phenylpropionyl)phenylacetic acid.*—4 - (3 - phenylpropionyl)phenylacetic acid (4.25 g., 0.017 mole) is mixed with paraformaldehyde (0.5 g., 0.017 mole) and dimethylamine hydrochloride (1.4 g., 0.017 mole). After adding five drops of acetic acid, the mixture is heated at 80–90° C. for one hour. The mixture is shaken with water and ether, the water layer separated and made basic with sodium bicarbonate and then heated at 80–90° C. for 20 minutes. The solution is cooled and acidified with hydrochloric acid to give 4-(2 - methylene-3-phenylpropionyl)phenylacetic acid as a solid which is crystallized from benzene.

EXAMPLE 8

*Sodium 4-(2-methylenebutyryl)phenylacetate*

4-(2-methylenebutyryl)phenylacetic acid, from Example 1 (5 g., 0.023 mole), is added slowly with shaking to a solution of 1 N sodium hydroxide (containing 0.023 mole of sodium hydroxide to give a solution of sodium 4-(2-methylenebutyryl)phenylacetic acid in water. The salt can be isolated by evaporating the solution to dryness.

EXAMPLE 9

*Methyl 4-(2-methylenebutyryl)phenylacetate*

4-(2-methylenebutyryl)phenyl acetic acid from Example 1 (21.8 g., 0.1 mole), is dissolved in methanol (125 ml.), a trace of hydrogen chloride gas is added and the mixture kept at 25–30° C. for 48 hours. The mixture then is evaporated to dryness at reduced pressure at 35° C. The residual oil is taken up in ether, the ether solution washed with 10% sodium bicarbonate and then with water and dried over sodium sulfate. The ether is evaporated and the residue distilled to obtain methyl 4-(2-methylenebutyryl)phenylacetate.

EXAMPLE 10

*4-(2-methylenebutyryl)phenylacetamide*

4 - (2 - methylenebutyryl)phenylacetic acid, from Example 1 (21.8 g., 0.1 mole), is dissolved in dry benzene (75 ml.) and thionyl chloride (0.11 mole) is added. The mixture is heated on a steam bath for 1 hour and the benzene and excess thionyl chloride then evaporated at 80° C. at reduced pressure. Two additional portions (75 ml.) of dry benzene are added and evaporated. The 4-(2-methylenebutyryl)phenylacetyl chloride so obtained is dissolved in ether (75 ml.) and anhydrous ammonia gas is bubbled into the solution until the flask comes to constant weight (absorption of ammonia ceases). Water is added to dissolve the ammonium chloride that has separated. The ether layer is separated, washed with water, dried and evaporated to obtain 4-(2-methylenebutyryl) phenylacetamide.

EXAMPLE 11

*[4-(2-methylenebutyryl)phenylacet]-N',N'-dimethylhydrazide hydrochloride*

4 - (2 - methylenebutyryl)phenylacetyl chloride (9 g., 0.0348 mole), prepared as described in Example 10, is dissolved in ether (30 ml.) and unsymmetrical dimethyl hydrazine (4.16 g., 0.0696 mole) is added dropwise over 1 hour. A vigorous reaction occurs and solid dimethylhydrazine hydrochloride separates. Water is added and the ether layer is separated, washed with water and dried over sodium sulfate. Alcoholic hydrogen chloride then is added dropwise to the ether solution. A small amount of yellow oil separates, the ether then is decanted from the oil which is discarded and alcoholic hydrogen chloride is added to the ether solution until precipitation ceases. The ether is decanted leaving an oil that solidifies on trituration with fresh ether. The [4-(2-methylenebutyryl)phenylacet] - N',N' - dimethylhydrazide hydrochloride is collected and dried over phosphorus pentoxide.

While the above examples describe the preparation of certain compounds which are illustrative of the novel compounds of this invention, it is to be understood that the invention is not to be limited to the specific compounds described in the examples or by the specific reaction conditions described for the preparation of these compounds but is to be understood to embrace variations and modifications thereof which fall within the scope of the appended claims.

What is claimed is:

1. A product having the structural formula

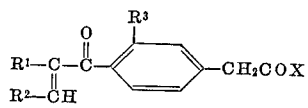

wherein $R^1$ is selected from the group consisting of lower-alkyl, mononuclear aryl-lower-alkyl and mononuclear aryloxy;

$R^2$ is selected from the group consisting of hydrogen and lower-alkyl;

$R^3$ is selected from the group consisting of hydrogen, halogen and lower-alkyl; and X is selected from the group consisting of hydroxyl, -O-(alkali metal), -O-(alkaline earth metal), lower-alkoxyl, amino and 1,1-di-lower-alkyl-hydrazino and the nontoxic, pharmacologically acceptable acid addition salts thereof.

2. A product having the structural formula

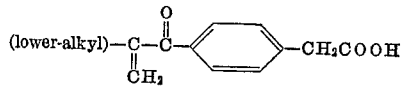

3. 4-(2-methylenebutyryl)phenylacetic acid.

4. A product having the structural formula

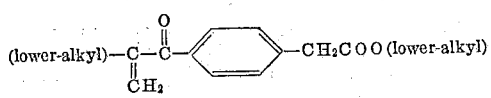

5. Methyl 4-(2-methylenebutyryl)phenylacetate.
6. 4-(2-methylenebutyryl)phenylacetamide.
7. [4-(2-lower-alkylacryloyl)phenylacet]-N',N'-di-lower-alkylhydrazide.
8. [4-(2-methylenebutyryl)phenylacet]-N',N'-dimethylhydrazide.
9. 3-halogen-4-(2-lower-alkylacryloyl)phenylacetic acid.
10. 3-chloro-4-(2-methylenebutyryl)phenylacetic acid.
11. 3-(lower-alkyl)-4-(2-lower-alkylacryloyl)phenylacetic acid.
12. 3-methyl-4-(2-methylenebutyryl)phenylacetic acid.
13. 4-(2-phenoxyacryloyl)phenylacetic acid.
14. 4-(2-methylene-3-phenylpropionyl)phenylacetic acid.
15. 4-(2-ethylidenepropionyl)phenylacetic acid.

References Cited

Adams et al., Organic Reactions, John Wiley & Sons, Inc., New York, 1942, pages 304–319.

Migrdichian, Organic Synthesis, Rheinhold Publishing Corp., New York, 1957, pages 4–7 and 533–534.

LORRAINE A. WEINBERGER, *Primary Examiner.*

T. L. GALLOWAY, *Assistant Examiner.*